May 19, 1953  G. S. SHAAK  2,638,869
MACHINE FOR INKING THE EDGES OF SOLES AND HEELS OF SHOES
Filed June 29, 1950  6 Sheets-Sheet 1

Inventor
George S. Shaak
by James Atkins
Attorney

Inventor:
George S. Shaak
by James Atkins
Attorney

May 19, 1953 G. S. SHAAK 2,638,869
MACHINE FOR INKING THE EDGES OF SOLES AND HEELS OF SHOES
Filed June 29, 1950 6 Sheets-Sheet 3

Inventor:
George S. Shaak
by
James Austin
Attorney

May 19, 1953 G. S. SHAAK 2,638,869
MACHINE FOR INKING THE EDGES OF SOLES AND HEELS OF SHOES
Filed June 29, 1950 6 Sheets-Sheet 4

Inventor:
George S. Shaak
by James Arthur
Attorney.

May 19, 1953  G. S. SHAAK  2,638,869
MACHINE FOR INKING THE EDGES OF SOLES AND HEELS OF SHOES
Filed June 29, 1950  6 Sheets-Sheet 5

Inventor:
George S. Shaak
by James Atkins
Attorney

May 19, 1953          G. S. SHAAK          2,638,869
MACHINE FOR INKING THE EDGES OF SOLES AND HEELS OF SHOES
Filed June 29, 1950                       6 Sheets-Sheet 6

Inventor
George S. Shaak
by James Atkins
Attorney.

Patented May 19, 1953

2,638,869

UNITED STATES PATENT OFFICE 2,638,869

MACHINE FOR INKING THE EDGES OF SOLES AND HEELS OF SHOES

George S. Shaak, Avon, Pa.

Application June 29, 1950, Serial No. 171,126

9 Claims. (Cl. 118—209)

The invention relates to a machine for inking the edges of soles and heels of shoes.

The invention more particularly relates to an automatic machine for staining, treating or applying a uniform coat of ink with the desired degree of thickness to the edge face of the sole and heel of a shoe, and a primary object is to provide a machine for applying ink without soiling or defacing the upper or white stitching on the welt or upper portion of the sole and heel or the white stitching on the tread, and with greater dispatch and facility than the normal hand operation.

A further object of the invention is to provide a machine for effecting a more consistently delicate touch over the entire edge face of the sole and heel than is possible with the normal hand operation.

A still further object of the invention is to provide a machine which is adapted to ink the edges of soles and heels of shoes of variable sizes as well as those having variable curvatures of soles.

Other objects and advantages of the invention will present themselves in the course of the following detailed description, taken in connection with the accompanying drawings, wherein Figure 1 is a side elevational view of the improved machine.

Fig. 7 is a side elevational view of the inking assembly.

Fig. 7-A is a detail view of the disk scraper.

Fig. 8 is a top plan view of the fulcrum selector.

Fig. 9 is an end view of the selector shown in Fig. 8.

Fig. 10 is a plan view partially in section of the ratio lever.

Fig. 11 is an end view of the ratio lever.

Figure 13:
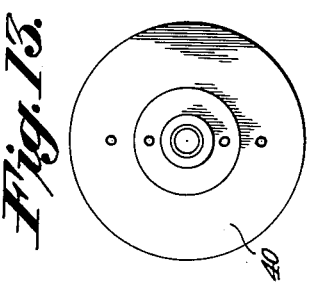
Figure 12:
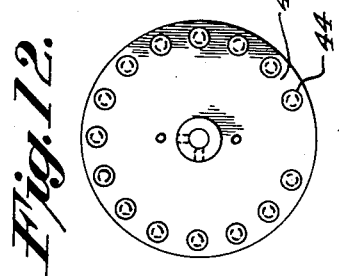
Figure 14:
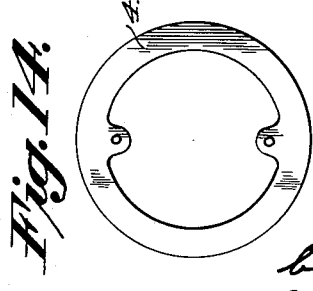

Figs. 12, 13 and 14 are sectional views of the component parts of the contour selector.

Figure 15:
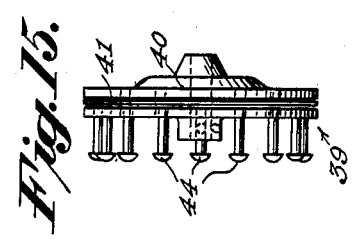

Fig. 15 is an assembled elevational view of the contour selector.

Figure 16:
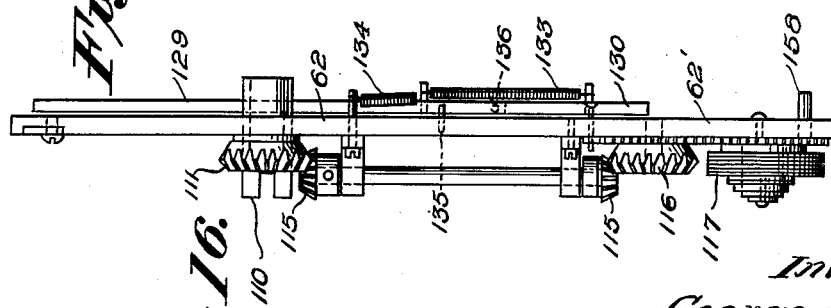

Fig. 16 is an edge view of the inking assembly.

In the following description, the structure is described with the operation of the machine for the purpose of conserving space as well as time in the reading thereof.

Figure 1:
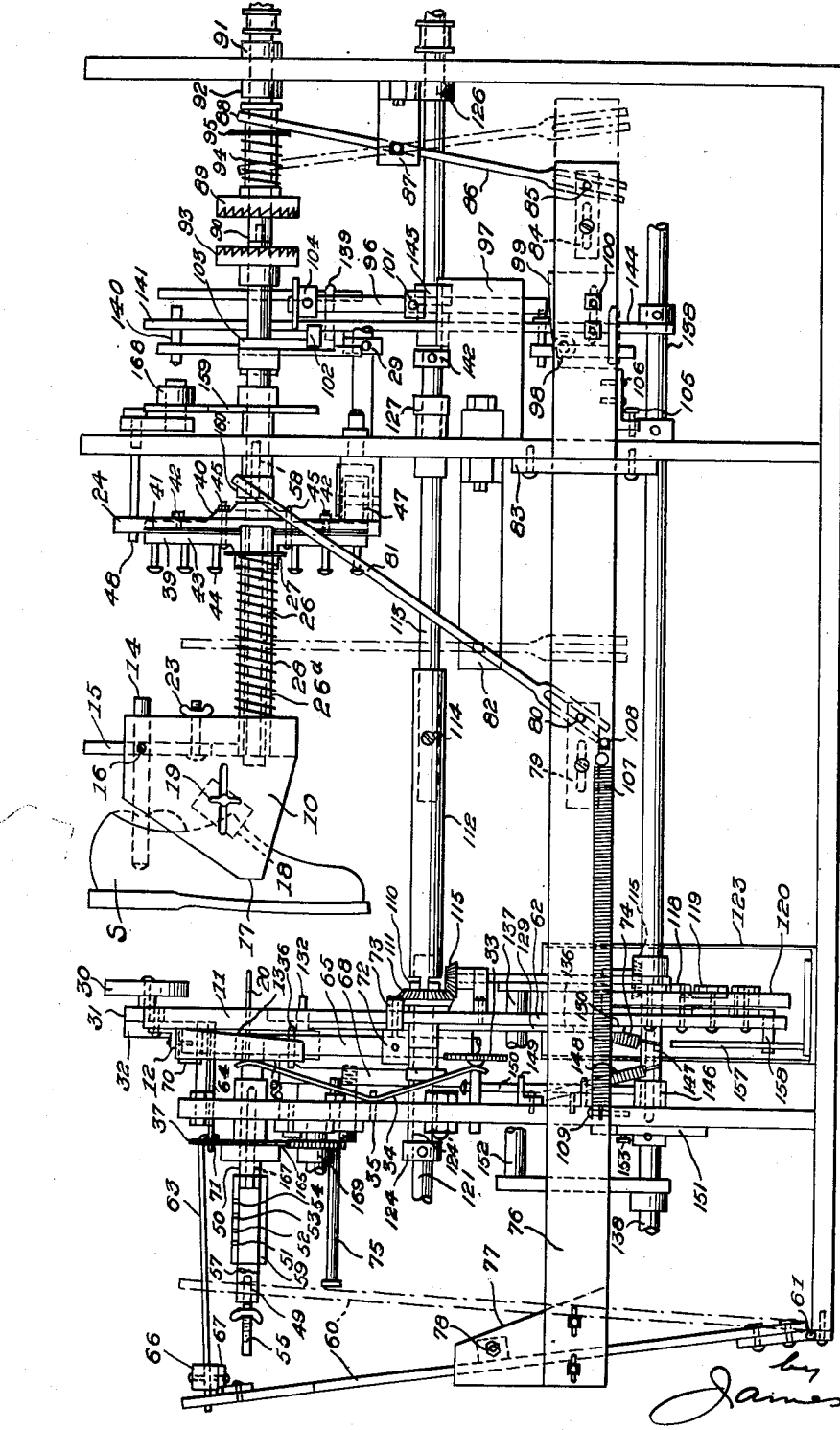

Referring now in detail to the drawings, the machine is shown in normally open position in Fig. 1, preparatory to receiving a last-supported shoe for an inking operation.

Figure 2:
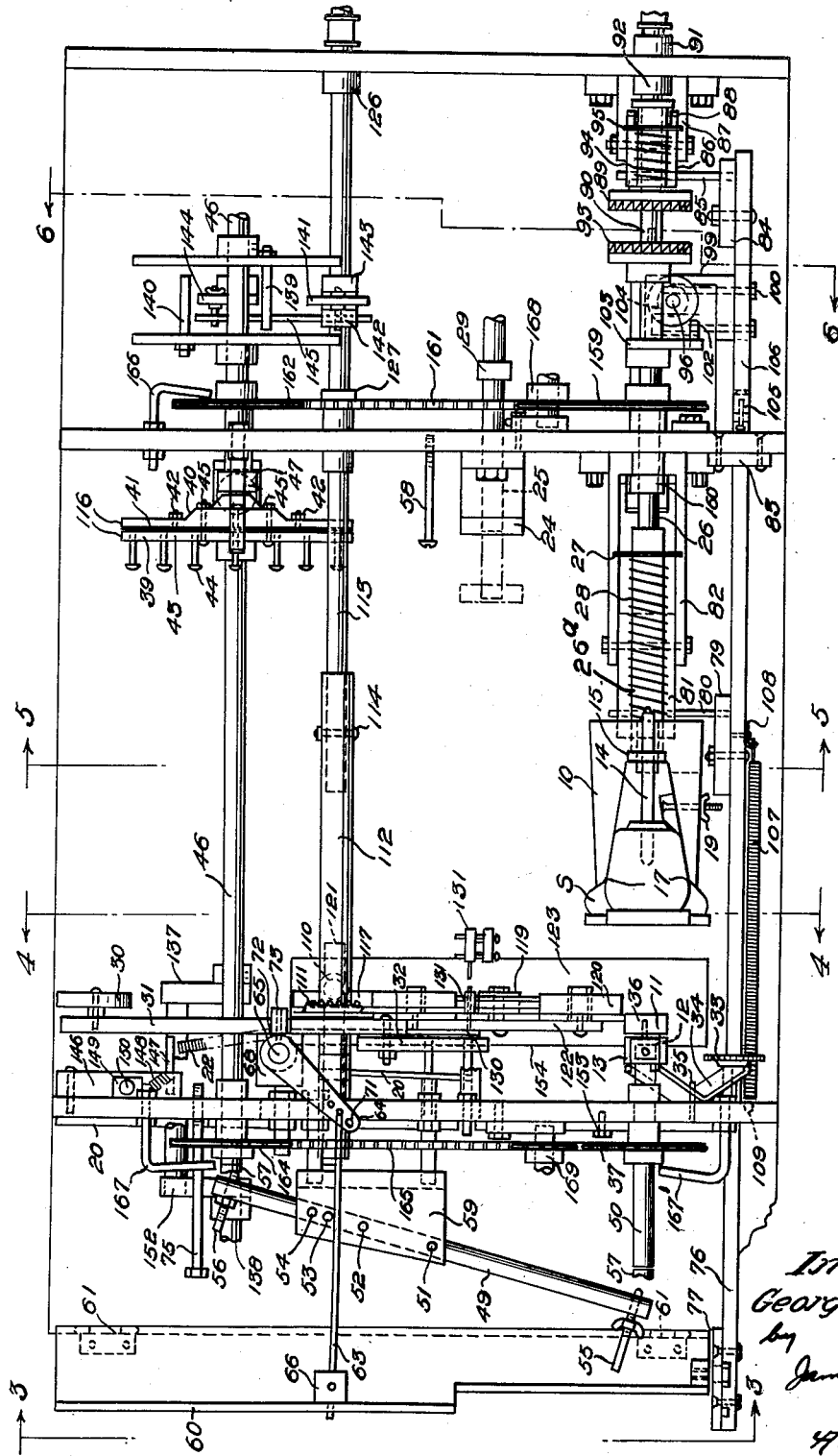
Fig. 2 is a top plan view.

As shown in Fig. 2, a right shoe S, with the heel up, is presented to the shoe retainer 10. The retainer 10 is thrust forward against the tread rest 11 for subsequent adjustment and positioning of both the retainer 10 and the shoe S, and the tread rest 11 is swingable back and forth by means of a hinge 12 which is secured to the tread rest base 13. The retainer 10 is secured to a keyed sleeve 26a which slides back and forth in a keyway in shaft 26, and a compression spring 28 and a washer 27 are supported on the keyed sleeve.

A last pin 14 is supported in a retainer 15, and in the adjustment same is thrust into the thimble of the shoe last as far as possible, then withdrawn approximately one-fourth inch and secured with a set screw 16. A feature of this adjustment is to permit the shoe to pivot on both tapered ends 17 of the shoe retainer 10. The last pin 14 is bent up at an angle of three degrees, which prevents the shoe from dropping off the last pin when the shoe is not in contact with the tread rest 11, as in Fig. 1.

The shoe is subsequently turned toe upwardly, and a shoe stabilizer 18, comprising a bolt and wing nut 19, is adjusted firmly against the instep on the right side of the shoe, which is shown as a right shoe. In the case of a left shoe, the stabilizer 18 is transferred to the slot on the left side of the shoe retainer 10 and is placed firmly against the instep on the left side of the shoe. The purpose of the stabilizer 18 is to provide for a firm engagement of the shoe sole and heel with the tread rest 11 and remain in the same plane without any wobble.

The shoe is next turned ninety degrees to a horizontal position with the heel directed toward the left of the operator, and an indicator 20 is swung at right angles to the shoe into contact with the heel. The shoe is then turned 180° and note is taken as to whether the toe is spaced approximately three-fourths inch from the indicator 20. The indicator 20 preferably is formed of 14 gauge copper wires which are capable of being readily bent by an operator's fingers for accommodation of large or small sizes of shoes.

A shoe to be properly treated requires that it be off center of its axis of rotation as it rotates, so that the heel describes a larger circle than the toe by approximately three-fourths inch. This feature provides a more uniform and thorough coat of ink because the heel, being wider than the sole, requires more pressure from the ink-transferring disk 20, and which pressure is exerted by spring 22, Fig. 4. The ink-transferring disk 120 operates from beneath the shoe, as is indicated in Fig. 1.

The last pin retainer 15, Fig. 1, provides for adjusting the shoe off center, and the retainer 15, which comprises a bolt and wing nut 23, provides the lateral off center adjustment of the shoe by shifting the retainer 15 back or forth in the slot provided, the wing nut 23 securing it in any desired position. This feature provides for accommodating large or small sizes of shoes. The indicator 20 is returned to inactive position after proper adjustment of the shoe.

Figure 5:
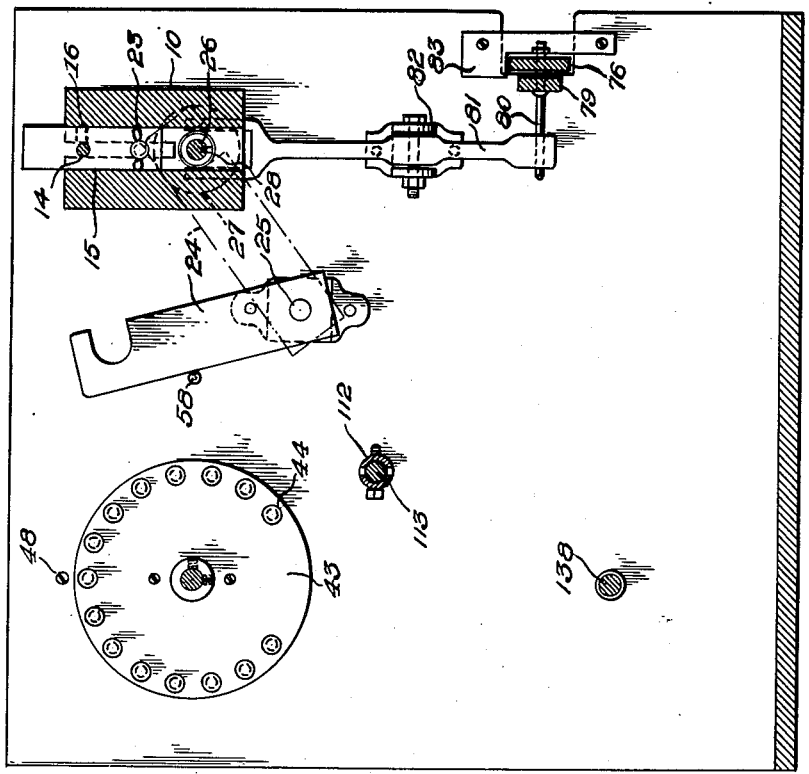
Fig. 5 is a vertical sectional view in the plane of line 5—5 on Fig. 2.

A shoe-stabilizing arm 24, Fig. 5, which is employed temporarily for shoe aligning purposes, is secured to a shaft 25, and the arm is swung to the right, upon a shoe-rotating shaft 26 directly behind a washer 27, Figs. 2 and 5. The arm 24 is thrust forward, as indicated in Fig. 2, exerting pressure on the spring 28, which provides for the shoe resting firmly against the tread rest 11 for subsequently described alignment.

The arm 24 is stopped by a collar 29, Figs. 1 and 2, which is properly positioned and secured to the shaft 25. Torque exerted by a spring 28 against the remote end of arm 24 holds the arm in position until it is released when alignment of the shoe is completed.

A disk 30, which serves as a temporary shoe-aligning guide, lies in the same plane (perpendicularly) as the ink-transferring disk 120 which lies directly beneath it, Figs. 1 and 2.

Figure 4:
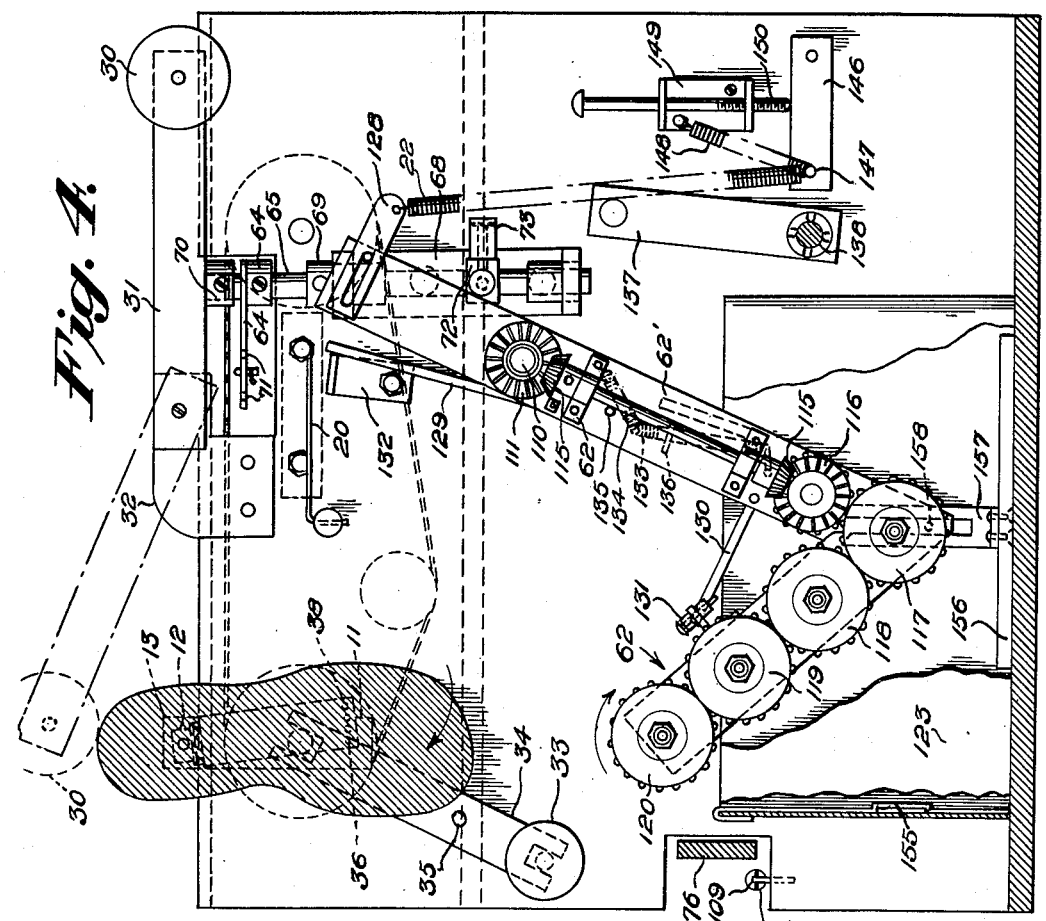
Fig. 4 is a vertical sectional view on the plane of line 4—4 on Fig. 2.

The disk 30 is supported by an arm 31 pivotally connected to a bracket 32, and the disk is swung to the left in Fig. 4 directly on top of the heel edge which is directed upwardly, the bracket 32 being adjustable back and forth on the frame.

A hand wheel 33, upon being turned back or forth in a screw-threaded hole, actuates a curved lever 34 back or forth. The lever 34 provides a movable support for the tread rest base 13. A screw 35 inserted in a hole in lever 34 serves as an anchor, and the lever 34 fulcrums at the said screw. The lever 34, therefore, provides for positioning the shoe back and forth, thereby making possible the perpendicular alignment of the peripheral edge of the shoe heel, which is closest to the shoe upper, with the adjacent peripheral edge of the aligning disk 30. The toe of the shoe is then turned up for similar adjustment with the aligning disk 30.

Figure 3:
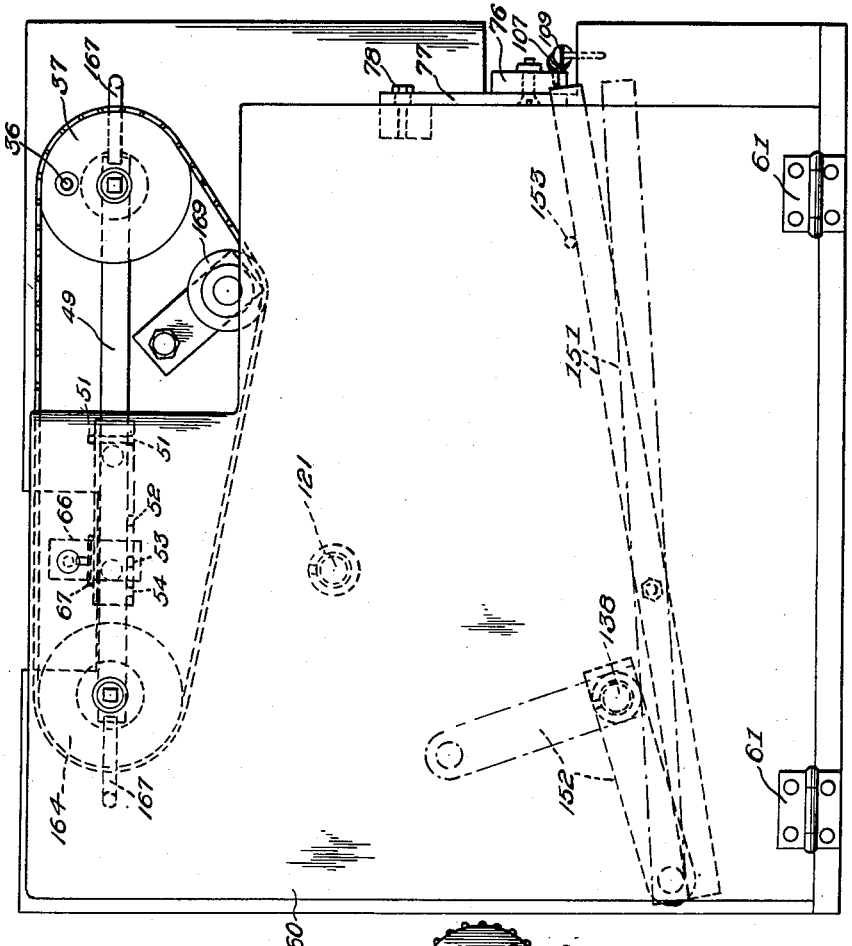
Fig. 3 is an end elevational view as observed in the plane of line 3—3 on Fig. 2.

A toe-adjusting screw 36 in the tread rest base 13 provides for the alignment of the toe's peripheral edge, which is closest to the shoe upper, with the adjacent peripheral edge of the aligning disk 30. The adjusting screw 36, Fig. 3, is accessible by a screw driver inserted through a hole in the sprocket 37 as well as through an aligned hole in the frame.

A feature of the tread rest 11 adjustment, in addition to its back and forth motion, is its lateral motion or adjustment, as indicated in Fig. 4. The lateral adjustment is employed in positioning the tread rest 11 to the right when treating a right shoe, and to the left when treating a left shoe, as depicted in Fig. 4. Four shallow holes 38, which are adapted to selectively receive the point of the toe-adjusting screw 36, are located in the tread rest 11, and such holes determine the lateral positioning of the tread rest 11 to the right or to the left.

The lateral adjustment provides for centering the tread rest 11 longitudinally on the sole and heel, since the shoe is off center longitudinally, which is subsequently more fully explained. This prevents the gear of the ink-transferring disk 120 from striking that portion of the tread rest 11 which lies adjacent to the inside shank of the shoe.

A contour selector 39, as indicated in Figs. 1, 2 and 15, comprises a deformable face plate 40 to which is secured a flexible steel diaphragm 41 by means of two bolts 42, and a rigid steel face plate 43 which is provided with a number of screw-threaded holes near its peripheral edge, into which are inserted round head bolts 44. The plates 40 and 43 are secured to each other by two bolts 45, and the selector 39 is secured to a shaft 46.

A roller 47 anchored to the frame serves to reciprocate shaft 46 axially back and forth, whenever the periphery of the rubber face plate 40 is rendered irregular or undulating, by projecting one or more of the bolts 44 through the steel face plate 43, thereby producing an irregular periphery on the rubber face plate 40. The reciprocating motion of the shaft 46 occurs when the projected peripheral portion of the rubber plate 40 passes over the roller 47.

The flexible steel diaphragm 41 secured to the rubber face plate 40 provides a rigid base for the irregularly projected periphery of the rubber plate 40 as it passes over the roller 47. The roller 47 revolves on a shaft or pin supported in a housing which is secured to the frame of the machine, and the projecting bolts 44 strike the metal diaphragm 41 midway between its inner and outer edges. The object of the contour selector 39 is to provide on the periphery of its rubber face plate 40 the exact contour of a sole and heel, on both large and small sizes of shoes.

With the shoe turned toe upwardly the edge face of the sole at the toe end thereof is aligned with the adjacent aligning disk 30, Fig. 1, and the disk lies in the same plane perpendicularly as the ink-transferring disk 120 which lies beneath it, Figs. 1 and 2.

The portion of the selector 39 which contains no bolt, as indicated in Fig. 12, is regarded as the starting point for selecting or establishing the contour, and such portion is initially at the toe of the shoe.

The shoe is manually rotated, preferably counter-clockwise, and whenever the edge face of the sole or heel diverges from the plane of the aligning disk 30 one or more of the bolts 44 are projected through the steel face plate 43. Assuming that such divergence is first approximately one-eighth inch and upon further shoe rotation of one-fourth inch, etc., the bolt directly under the indicator 48 is projected approximately one-eighth inch, the next bolt is projected one-fourth inch, etc. until proper adjustment is established.

When the edge face of the sole or heel returns to the plane of the disk 30 no further projection of bolts is necessary. This procedure is continued for one revolution of the shoe. The contour of the edge face of the sole and heel of any shape or size shoe is established by the selector 39.

A complete inking machine comprises two units. One unit is to accommodate a right shoe and another unit is to accommodate a left shoe, and the operator treats right and left shoes alternately.

As is indicated in Fig. 2, a tread rest shaft 50 supported by a bearing is provided with a keyway which passes over a key in the sprocket 37, and the tread rest base 13 is secured to such shaft, Whenever the roller 47 produces a thrust on the shaft 46 of one-half inch, for example, a ratio lever 49 registers a similar thrust of one-half inch on the tread rest shaft 50, and the shoe on the tread rest 11 also registers a forward motion of one-half inch.

Assuming that the fulcrum pin 51 is located in the hole at the mid-point of the ratio lever 49, upon transferring the fulcrum pin 51 to the next hole 52, the tread rest 11 travels double the distance or one inch. Similarly, when the pin 51 is located in the hole 53, shaft 50 travels three times the distance or one and one-half inches, and upon locating pin 51 in hole 54 shaft 50 travels four times the distance or two inches. This feature of versatility of the ratio lever 49 provides for treating shoes covering the complete range in sizes from infants' to men's shoes, regardless of the irregularity of the contour of the sole and heel.

The ratio lever 49 is provided with adjusting bolts 56 and 55 at its opposite ends and adjacent the shafts 46 and 50, respectively. When establishing a contour of the selector 39, sufficient slack is required between the bolts and shafts, which is obtained by first turning the bolt 55 backwardly until it is flush with the ratio lever 49, and which adjusting bolt 56 is generally finally fixed when it projects approximately one-fourth inch.

A member 57 on the end of each of the shafts 50 and 46 covers the keyways in the shafts and provides solid surfaces when bolts 55 and 56 come into contact with them while they are rotating. The adjusting bolt 55 is turned forward in a screw-threaded sole in lever 49 until it makes firm contact with the tread rest shaft 50 and all the slack is taken up which otherwise exists in the train of connections from shaft 50 to roller 47.

The roller 47 provides each thrust which shaft 46 exerts, as the shaft contour selector 39 rotates. The thrust is transmitted by shaft 46 through the ratio lever 49 to the tread rest shaft 50 and upon the tread of the shoe. By this action, the edge face of the sole and heel is automatically rotatably positioned in alignment with the ink-transferring disk 120 as the shoe rotates during the inking operation.

The temporary aligning disk 30 is now swung to the right away from the shoe, into idle position, Fig. 4, and the temporary shoe-stabilizing lever 24 is released by swinging it to the left against the stop 58, Figs. 1, 2 and 5. The shoe is now ready for the automatic inking operation.

A fulcrum selector 59, indicated in detail in Figs. 8 and 9, serves as a support for and as a guide in which the ratio lever 49 operates, and it includes two threaded bolts secured to its base which are inserted or projected through the frame and secured to it. Two nuts placed on each bolt, one on either side of the frame, provide for adjustment back and forth of the selector 59 as the need requires.

The angular construction of the selector 59 provides that the normal position of the ratio lever 49 can be maintained at an angle to the frame. With a maximum travel of one-half inch of the shaft 46 against the ratio lever 49, a maximum travel of two inches is produced upon the shaft 50, assuming that the fulcrum pin 51 is inserted in the hole 54 which is farthest to the left.

The purpose of placing the holes 51 to 54 in the selector 59 at an angle, and of spacing the holes in the ratio lever 49 to conform with those of the selector 59, is that the leverage ratio of the lever 49 can be changed by merely shifting the fulcrum pin from one hole to another without changing the relative position of the lever 49 with regard to the position of the shafts 50 and 46.

For the larger sizes of shoes, where a greater curvature of the sole exists, and a more irregular contour is described than in the smaller sizes of shoes, a greater travel of the tread rest shaft 50 is required.

The function of the operator's lever 60, shown in Figs. 1 and 2, when a shoe is presented toe downwardly, is to "close" the machine by thrusting the lever 60 forward for the automatic inking operation. The lever 60, which is attached to the base of the machine by two hinges 61, actuates the geared inking disk assembly 62 by permitting it to rise so that contact takes place between the ink-transferring disk 120 and the edge face of the sole at the toe. The tension exerted by the spring 22, Fig. 4, raises the assembly.

Referring to Figs. 1, 2 and 4, when the lever 60 is thrust forward a rod 63 actuates an arm 64 which turns the vertical shaft 65 to which it is secured. The rod 63 is attached to a swivel 66 which swings on the hinge 67 which is secured to the lever 60. The rotatable vertical shaft 65 is supported by bearings in an adjustable bracket 68, and a supporting collar 69 is secured to the shaft. A collar 70, also secured to the vertical shaft 65, supports the aligning lever 31, and three holes 71, indicated in Fig. 4, in the remote end of the rotatable arm 64 provide for adjustment between same and the rod 63.

A collar 72 comprising a roller 73 is secured to the vertical shaft 65. When the lever 60 is thrust forward, the roller 73 turns approximately 90 degrees away from the assembly 62 permitting it to rise through the tension exerted by the spring 22, indicated in Fig. 4, and the adjustable lever stop 75 serves to limit the forward thrust of the operator's lever 60.

A main arm 76 is simultaneously actuated with the assembly 62, and this arm comprises an adjustable bracket 77 which is secured by a bolt 78 to the lever 60 through a bearing in the bracket 77.

Also attached to the main arm 76 is an adjustable bracket 79 to which is secured a bolt 80 which projects through a slot in the vertical lever 81 rotatably supported intermediate its ends by a bearing 82. The lever 81 takes the place of the temporary shoe stabilizing arm 24, and its function is to hold the shoe firmly against the tread rest 11 during the inking operation by a thrust against the washer 27 and the compression spring 28. A guide bracket 83 serves to maintain the position of the main arm 76.

Also attached to the main arm 76 is an adjustable bracket 84 to which is secured a bolt 85 which projects through a slot in a vertical lever 86 rotatably supported intermediate its ends by the bearing 87. A yoke 88 at the top of lever 86 actuates the driving clutch 89 which slides in a keyway on a shaft 90 supported in suitable bearings and collars 91 and 92 through engagement with the frame to maintain the position of the shaft.

The driving clutch 89 is maintained in motion constantly so that it is instantly ready to rotate a shoe when engaged with the driven clutch 93. A compression spring 94 and washer 95 inserted on the body of the driving clutch 89 ahead of the yoke 88 insure smooth clutch-engaging action, and by firm clutch engagement prevent back lash of the shoe against the ink-transferring disk 120 as the shoe rotates.

A vertical locking shaft 96, which is supported in a bearing 97 on the frame, drops by gravity directly in front of a roller 98 supported by a bracket 99 when the main arm 76, to which the roller 98 is secured by the bolts 100, is thrust forward by the action of the operator's lever 60.

The vertical shaft 96 provides a lock, holding the main arm 76 and related mechanism in operative position while the shoe is being rotated and inked, and a collar 101 supports the shaft 96 on the bearing 97 after proper adjustment of the collar on the shaft.

The shoe is treated during one revolution thereof. When a revolution is completed, a pin 102 in an arm 103, which is secured to the shaft 26, lifts a disk 104, which is secured to the vertical shaft 96, and the action "unlocks" the mechanism. When the arm 76 is released from its locked position, the related mechanism springs back into normal or "open" position. A bolt 105 in a bracket 106, which is secured to the main arm 76, provides a stop for the released arm 76.

A tension spring 107 has one end thereof connected to a bracket 108 which is secured to the arm 76, and the other end of spring 107 is connected to a bolt 109 secured to the machine frame. The spring 107 functions to return arm 76 from its locked position to its normal open position. The geared inking disk assembly 62 comprises a V-shaped bracket 62' upon which is mounted a bearing in which is fitted a rotatable clutch 110 and to which is secured a bevel gear 111. A sleeve 112 on the power driven shaft 113 is provided with two clutch fingers on its forward end in meshing engagement with the clutch 110.

A bolt 114 secures the sleeve 112 to the power driven shaft 113 which transmits power through the gear 111 and the two pinions 115. A bevel gear 116, Figs. 4 and 16, secured to a spur gear transmits power from the lower pinion 115 to the four geared inking disks 117 to 120, thereby setting them in motion. The shaft 121 is stationary and provides a bearing for the assembly 62.

To remove the assembly 62 as well as the ink reservoir 123 from the machine, the bolt 114 is removed and the sleeve 112 is thrust back over the power-driven shaft 113. Two collars 124 on shaft 121 and at opposite sides of a frame part maintain the position of the shaft, while one or more spacers or washers 124, Fig. 1, inserted between the collars provide for adjustment back or forth of the assembly 62. Furthermore, the shaft 113 is maintained in position by collars 126 and 127 cooperating with the frame.

A slotted bar 128 disposed at the top of the bracket 62', Fig. 4, to which one end of the spring 22 is anchored, is positioned to the right when treating the larger sizes of shoes. This provides sufficient clearance for the spring 22 when the rotatable vertical shaft 65 swings the roller 73 through an arc of approximately 90 degrees.

The object of the assembly 62 is to transfer ink from the reservoir 123 onto the peripheral surface of the four rotating inking disks 117 to 120, and to deposit a predetermined quantity of ink upon the edge face of the sole and heel of a shoe when positioned on the tread rest 11 directly above the reservoir 123.

The first two disks 117 and 118, which are regarded as the ink-supplying disks, are identical in construction and are located at the apex of the bracket 62' on which they are rotatably mounted. The disks 117 and 118 serve to transmit ink on their peripheral surface to the respective peripheral surfaces of the third or ink-regulator disk 119 and provide a means for crushing any lumps and cleaning of the ink.

These uniform disks each comprises a number of thin disks built up to the desired width or thickness, and they are each placed on one end of a rotating shaft which is secured to a spur gear. The opposite end of the shaft is threaded, and a nut secures the disks in position.

A stationary shaft with a smaller diameter is inserted into the bore of the rotating shaft and is inserted into a hole in the bracket 62' to which it is secured by means of a screw. The stationary shaft has a shoulder cut on one end so that it rests on the bracket 62'. The opposite end of the stationary shaft is adapted for receiving a washer and screw which hold the rotating shaft in position. The construction of all rotating and stationary shafts is similar.

The ink-regulator disk 119 delivers a predetermined quantity of ink to the ink-transferring disk 120, and it comprises a number of thin disks of the same diameter as the ink-supplying disks. Spacers of smaller diameter are employed in building up the disk units.

The above noted arrangement provides for disposition of the ink-delivering disks anywhere desired on the rotating shaft. Ink deposited on the transferring disk 120 must be properly positioned on its periphery so that it will center on the edge face of the sole. The width of an ink-delivering disk which will properly coat the sole will coat only that portion of the heel which lies in the same plane as the sole. Therefore, a narrower ink-delivering disk must be spaced away from the wider disk, so that a separate deposit of a smaller quantity of ink be made on the periphery of the transferring disk 120, which will not coat the sole, but provides for fully coating the heel. Provision for increasing or diminishing the quantity of ink which the regulator disk 119 will deliver is obtained by employing wider or narrower ink-delivering disks.

A second provision for regulating the flow of ink is by spacing the stationary shafts, upon which the four disks rotate, further apart or closer together. The holes in the bracket 62' in which the stationary shafts are secured are slightly larger than the shafts, which permit a micrometer adjustment.

A third provision for regulating the flow of ink is by increasing or decreasing the speed of the geared inking disks in the assembly 62.

Ink-control levers 129 and 130, Figs. 4, 7 and 16, which are mounted on the bracket 62', automatically start and stop the delivery of ink to the transferring disk 120, and a rubber scraper 131, Figs. 2 and 4, which is located adjacent to the regulator disk 119, is supported by a pin secured to lever 130 for cooperation with the disk 119.

When a shoe has been treated and the mechanism of the machine is released to "open" position, the assembly 62 is automatically lowered so that contact no longer exists between the shoe and the ink-transferring disk 120.

The top portion of the lever 129 comes into contact with an adjustable stop 132, Fig. 4, which is secured to the machine frame. Lever 129 actuates the curved lever 130, to one end of which the scraper 131 is secured, a tension spring 133 acts on lever 130 and urges the scraper 131 into contact with the regulator disk 119 which scrapes or wipes the disk clean of ink, while the treated shoe is removed and another is presented for inking. A tension spring 134 returns the lever 129. The screw or pin 135 in the bracket 62' provides a stop for lever 129, and the adjusting screw 136 positions the rubber scraper 131 relative to lever 129.

When a succeeding shoe is treated, the assembly 62 rises through the action of the operator's lever 60, and the scraper 131 automatically springs away from the regulator disk 119 through the tension exerted by the spring 134, thereby releasing the full flow of ink.

The four geared inking disks 117 to 120 are maintained in motion constantly so that the first three disks 117, 118, and 119 are loaded with ink ready for coating a sole and heel at any time, and the surplus ink which the scraper 131 removes flows downwardly past the ink-supplying disks 117 and 118 into the reservoir 123. Furthermore, the supply and delivery mechanism has the advantage of keeping the ink in constant motion on moving parts of the inking disks 117 to 119 so that it has no opportunity to dry or thicken and thereby impede its delivery.

The ink-transferring disk 120, as it rotates under power, applies or wipes a coat of ink on the edge face of the sole and heel as the shoe rotates under power. The disk 120 and the shoe are driven in the same direction as indicated by the arrows thereon, Fig. 4, thus providing the desired wiping action of the ink transferring disk 120 against the edge face of the sole and heel.

The transferring disk 120 is of sponge rubber composition and is generally wider than the soles or heels of shoes being treated, and it is mounted on the rotating shaft with washers of slightly smaller diameter on either side. A nut placed on the threaded end of the rotating shaft provides for applying sufficient pressure against the sides of the rubber disk which causes its periphery to mushroom, thereby providing the desired convex contact surface, while at the same time providing for increasing or diminishing the density of the sponge rubber.

To accommodate larger sizes of shoes with wider soles and heels, longer rotating and stationary shafts replace the ones described, with either a wider sponge rubber disk employed, or else an additional rubber disk mounted next to the one above described. The other three inking disks are built up according to the desired widths.

The rotatable tension control arm 137, Fig. 4, which partially controls the tension of the spring 22 on the assembly 62, is secured to a shaft 138 and is actuated by two cams 139 and 140, Fig. 2. A follower 141 is supported by a bearing on shaft 113 and positioned with collars 142 and 143 on either side of it. Cam 139 has a radius approximately one-fourth inch longer than cam 140 and both cams are secured to the shaft 46.

Figure 6:
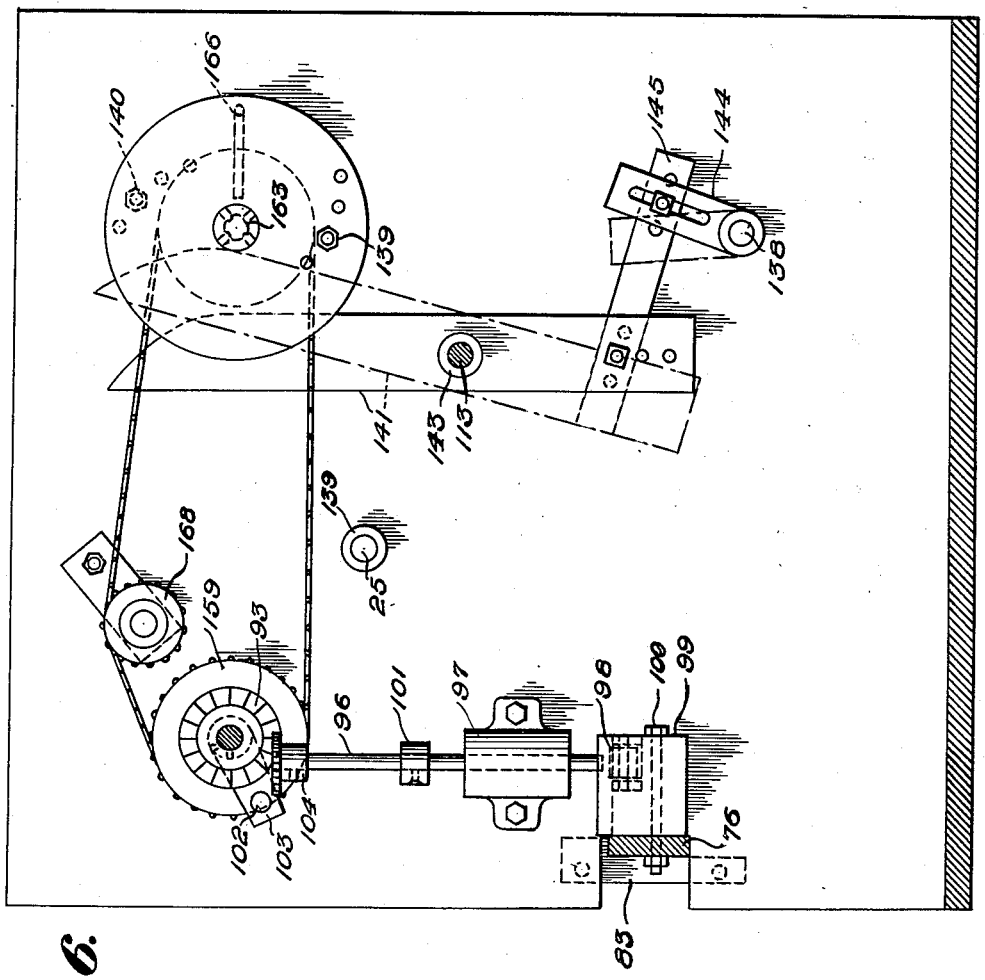
Fig. 6 is a vertical sectional view in the plane of line 6—6 on Fig. 2.

To the shaft 138 is secured an arm 144, Fig. 6, while a bar 145 connects the follower 141 and the arm 144. The arm 144 has a slot which provides for adjustment, thereby producing a greater or lesser arc on the rotatable tension control arm 137, Fig. 4.

Upon rotation of the shaft 46, and assuming that the ink transferring disk 120 rests on the edge face of the toe of the shoe, at the properly timed moment during rotation cam 139 strikes the follower 141, Fig. 6, and as the cam actuates the follower, the latter in turn actuates the tension control arm 137 against the spring 22, Fig. 4.

The pressure of the arm 137 against the spring 22 causes the transferring disk 120 to rise so that it follows the edge face of the sole to the shank with the required delicate touch. As the shoe turns over center at the shank, the cam 139 passes to its center on the follower 141, and the peak of tension exerted by the spring 22 when passing over center is rapidly spent.

The cam 139 then passes over the curved portion of the follower 141, thereby rapidly releasing the tension of the spring 22, which simultaneously diminishes the pressure of the ink-transferring disk 120 against the edge face of the heel. Similar procedure prevails with the cam 140 when the transferring disk 120 rests on the heel of the shoe during the course of rotation.

A feature of the differing radii of the cams provides for approximately three-eighths inch greater travel by the transferring disk 120 into the inside shank of a shoe when the shoe is in horizontal position (or turning over center) during the course of rotation. The reason for this is that the shoe is off center longitudinally.

The shoe retainer 10 is designed symmetrically to accommodate either a right or left shoe, so that only one retainer 10 is required. However, either a right or left shoe when supported in the retainer will be off center longitudinally. The differing radii of the cams 139 and 140 compensate for the shoe being off center longitudinally. Similarly, the lateral motion of the tread rest 11 compensates for the shoe being off center longitudinally.

An anchored adjustable tension-control bracket 146, Fig. 4, is provided with a bolt 147 which anchors one end of the spring 22, and provides for increasing or diminishing the tension of the spring. The spring 148 maintains the position of the bracket 146 whenever the spring 22 is removed simultaneously with the assembly 62. A bracket 149 secured to the frame supports a bolt 150 which provides the adjustment of the bracket 146.

Whenever a shoe is presented to the shoe-retainer 10 and the contour selector 139 is being adjusted while manually rotating the shoe, the tension spring 22, Fig. 4, is swung from the outside to the inside position or free of the rotatable arm 137, and the arm 137 drops by gravity, which serves two purposes: First, it positions the follower 141 out of range of the rotating cams 139 and 140, thereby relieving the operator from working against the tension of the spring 22 while manually rotating the shoe when adjusting the contour selector 39, and, second, the arm 152, which is secured to the shaft 138 (similarly to the arm 137), drops by gravity upon the locking lever 151, Fig. 3, which prevents the operator's lever 60 from being thrust forward, thereby locking the machine with regard to the inking operation.

During the process of aligning the shoe and adjusting the selector 39 the operator may forget to reposition the arm 137, Fig. 4, against the tension control spring 22. However, the locked position of the operator's lever 60 will remind him of such required re-positioning. This will avoid damaging the first shoe of every size run, whenever the contour selector 39 requires readjustment.

A bolt 153 serves as a stop when the lever 151 rises through the weight of the arms 137 and 152 upon it and retains the main arm 76 in locked position, and the collar on the shaft 138 serves as a stop when the lever 151 drops, Fig. 3.

The ink reservoir 123 (Fig. 4) supports a gauge 155 on which high-level and low-level readings are taken. The gauge is hung over the upper edge of the reservoir and is suspended within the reservoir adjacent a side wall thereof. Whenever the assembly 62 is in idle position the high-level of the ink must never be greater than to immerse more than three-fourths of the first ink-supplying disk 117 nearest the apex of the bracket 62'.

The reservoir 123 is removed from the machine similarly to the assembly 62, previously explained, by removing the bolt 114, Figs. 1 and 2, and thrusting the sleeve 112 back over the shaft 113. Two adjustable brackets on the surface of the base of the machine maintain the position of the reservoir 123.

An ink agitator comprises a rectangular screen of rigid expanded metal 156 secured to a vertical member 157. A pin 158 secured to the apex of the bracket assembly 62' on the opposite side of the geared disk 117 engages the slot of the vertical member 157. The raising and lowering motion of the assembly actuates the agitator back and forth across the bottom of the reservoir 123.

A sprocket 159, Fig. 2, is secured to the shaft 26 and a collar 160 maintains the position of the shaft. A chain 161 connects sprocket 159 with a sprocket 162 on shaft 46 supported in suitable bearings, which shaft contains a keyway.

A sprocket 164 is supported on the remote end of the shaft 46 and is connected by a chain 165 to the sprocket 37 on the shaft 50. The sprockets have keyed connections with the shafts and power is transmitted through the sprockets, as above described. Three curved bolts 166, 167 and 167' serve to maintain the position of the three sprockets with keys attached, whenever the shafts 50 and 46 are actuated back and forth. Two small idling sprockets 168 and 169, adjustably secured to the frame and supported in bearings, take up the slack in each chain.

While I have disclosed my invention in accordance with a single structural embodiment thereof, such is to be considered as illustrative only, and not restrictive, the scope of the invention being defined in the sub-joined claims.

What is claimed is:

1. A machine for inking the edge surface of the sole and heel of a shoe comprising a frame, a horizontal shaft rotatably supported by the frame, a shoe retainer supported by said shaft, a second horizontal shaft supported by the frame for rotation and for movement axially thereof, a third horizontal shaft co-axially of said first shaft supported by the frame for rotation and for movement axially thereof, adjustable means supported by said second shaft operative for effecting the axial movement thereof, an adjustable connection between said second and third shafts for imparting axial movement to the third shaft for cooperation with said retainer, and means for effecting simultaneous rotation of all of said shafts.

2. The structure according to claim 1, wherein said adjustable means comprises a deformable face plate, means for deforming said deformable plate in conformity with the contour of a sole and heel, and means engageable with said plate upon rotation of said second shaft for imparting said axial movement thereto.

3. The structure according to claim 1, wherein said adjustable connection comprises a lever pivoted intermediate its ends and having its opposite ends respectively engageable with said second and third shafts for imparting axial movement of the second shaft to the third shaft.

4. The structure according to claim 3, comprising a fulcrum selector member supported by the frame intermediate said second and third shafts, and said pivotal connection of said lever being adjustable lengthwise of said fulcrum selector member for varying the axial movement of the third shaft with respect to the axial movement of the second shaft.

5. The structure according to claim 1, together with a tread rest supported by said third shaft, said tread rest having a plurality of spaced holes therein for selectively receiving a relatively fixed adjusting screw for adjustment of the tread rest laterally of the axis of the shaft.

6. A machine for inking the edge surface of the sole and heel of a shoe comprising a frame, a first shaft rotatably supported in the frame, a shoe retainer connected to said shaft for movement axially thereof, a second shaft rotatably supported in the frame, cooperating means connected to the second shaft and to the frame for effecting axial movement of said second shaft, a third shaft rotatably supported in the frame having a tread rest supported by one end thereof in normally spaced relation to said retainer, lever means disposed between said second and third shafts for transferring axial movement of said second shaft to said third shaft, an ink reservoir disposed beneath said third shaft, an ink-supplying assembly supported by the reservoir and being normally spaced from said retainer, means for imparting rotation to all of said shafts, a hand operable lever, connections from said lever for setting shafts into rotation, moving said retainer toward said tread rest and for moving said inking assembly toward said retainer for inking engagement with a shoe retained thereby.

7. The structure according to claim 6, wherein said inking assembly comprises an angular bracket, yielding means normally urging one arm of said bracket in one direction for bringing the inking assembly into contact with a shoe, and said connections from said lever including means engageable with said arm for moving same in the opposite direction and withdrawing said inking assembly from inking engagement with the shoe.

8. The structure according to claim 6, together with a washer slidably disposed on said shaft, said connections from said lever including a bar engageable with said washer for urging same toward said retainer, and yieldable means disposed between said washer and said retainer.

9. The structure according to claim 6, wherein said connections from said lever include a bar extending longitudinally of the frame, means for locking said bar in position upon movement of said lever to a closed operative position of the machine, and means operative for releasing said bar for movement of the lever to its normally inoperative position.

GEORGE S. SHAAK.

References Cited in the file of this patent

UNITED STATES PATENTS

| Number | Name | Date |
|---|---|---|
| 1,387,963 | Bourn | Aug. 16, 1921 |
| 1,711,257 | Apfelbaum | Apr. 30, 1929 |
| 1,753,498 | Bourn | Apr. 8, 1930 |
| 2,008,801 | Stacey | July 23, 1935 |
| 2,039,359 | Stacey | May 5, 1936 |
| 2,203,572 | Johnson | June 4, 1940 |
| 2,442,335 | Bauer | June 1, 1948 |